United States Patent Office 3,257,461
Patented June 21, 1966

3,257,461
PHOSPHINE DIOLS AND RESINS DERIVED THEREFROM
André Rio, Lyon, France, assignor to Rhone-Poulenc S.A., Paris, France, a corporation of France
No Drawing. Filed Oct. 31, 1962, Ser. No. 234,530
Claims priority, application France, Nov. 2, 1961, 877,726; Oct. 18, 1962, 912,693
3 Claims. (Cl. 260—606.5)

This invention concerns certain new phosphine diols, a method for their preparation and new resinous condensation products derived therefrom.

Various derivatives of diphenyl- and dibenzyl-phosphines are known and derivatives of dibenzyl phosphines have been proposed for the preparation of epoxy resins.

In accordance with the present invention it has been found that the new phosphine oxide diols of the general formula:

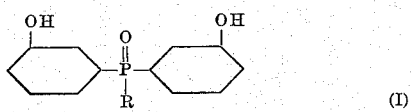

(I)

wherein R represents an alkyl radical containing from 1 to 4 carbon atoms or a cycloalkyl radical containing from 5 to 8 carbon atoms, are stable compounds which may be condensed with certain other bifunctional compounds, such as saturated or unsaturated dicarboxylic acids, dicarboxylic acid dichlorides and diisocyanates, to give hard resins (e.g. polyesters and polyurethanes) of relatively low combustibility and which have useful applications in the resin art. Thus the present invention includes within its scope not only the new compounds of general Formula I but also condensation products derived therefrom.

According to a further feature of the invention the new compounds of general Formula I are prepared by a process which comprises subjecting a compound of the general formula:

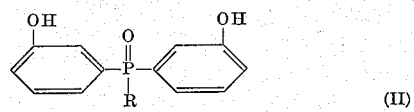

(II)

(wherein R is as hereinbefore defined) to catalytic hydrogenation at a pressure above 100 atmospheres and at a temperature from 100° to 250° C. The hydrogenation is preferably effected in an alcoholic medium and the catalyst is preferably of the Raney nickel type. It is particularly advantageous to operate under a pressure in the neighborhood of 300 atmospheres and at a temperature of about 150° C., because if the operation is carried out at a much higher temperature, for example at 200° C., there is a tendency (which becomes apparent at a temperature of about 200° C. and is positively disadvantageous using temperatures in excess of 250° C.) for the reaction mass to resinify and when, on the other hand, the operation is carried out at a significantly lower temperature, for example at about 100° C., excessive quantities of catalyst (e.g. up to 60% of the weight of starting material) are required to obtain a good yield. The preferred proportion of catalyst employed is about 10% calculated on the weight of the diol starting material.

The starting materials of Formula II may be prepared from the corresponding alkyl- or cycloalkyl-diphenyl phosphines oxides by the following series of steps according to known processes: mononitration of each phenyl nucleus in the meta-position, reduction of the dinitro derivative thus obtained into the corresponding diamine, and then conversion of the —NH₂ groupings into —OH groupings.

As already indicated herein the diols of general Formula I are very stable products which can be condensed with certain other bifunctional compounds, such as saturated or unsaturated dicarboxylic acids, dicarboxylic acid dichlorides and diisocyanates, to give hard resins of relatively low combustibility. Accordingly, the invention further includes condensation products which are polyesters and polyurethanes comprising residues of at least one of the diols of the general Formula I.

The following examples illustrate the invention.

*Example I*

Into an autoclave are introduced a solution of 50 g. of methyl-bis-(m-hydroxyphenyl)phosphine oxide in 50 cc. of ethanol, and 5 g. of Raney nickel. The mixture is heated to 150° C. and stirred for 6 hours at this temperature under a hydrogen pressure of 300 kg./cm.². After cooling, the reaction mass is withdrawn, the catalyst filtered and the ethanol evaporated in vacuo. There is thus recovered 47 g. of methyl-bis-(m-hydroxycyclohexyl) phosphine oxide (yield 94%) which is a solid, very hygroscopic product melting at 56–60° C. Infra-red spectography shows that the product is completely hydrogenated.

The initial methyl-bis-(m-hydroxyphenyl)phosphine oxide may be obtained by the method described in French specification No. 1,288,952.

*Example II*

Into an autoclave are introduced a solution of 28 g. of cyclohexyl-bis-(m-hydroxyphenyl)phosphine oxide in 50 cc. of ethanol and 5 g. of Raney nickel. The mixture is heated to 150° C. and stirred for 6 hours at this temperature under a hydrogen pressure of 300 kg./cm.². After cooling, the reaction mass is withdrawn, the catalyst filtered and the ethanol evaporated in vacuo. There is thus obtained 27 g. of cyclohexyl-bis-(m-hydroxycyclohexyl) phosphine oxide (yield 97%) which is a white, hygroscopic solid melting at 120–124° C., and which is soluble in alcohol and slightly soluble in water.

The initial cyclohexyl-bis-(m-hydroxyphenyl)phosphine oxide may be obtained from cyclohexyl-diphenylphosphine oxide by the method described in French specification No. 1,288,952, i.e. as follows:

Cyclohexyl-diphenylphosphine oxide is nitrated to give the corresponding m-dinitro derivative, M.P. 200° C., which is then reduced in aqueous medium with iron and hydrochloric acid to cyclohexyl-bis-(m-aminophenyl) phosphine oxide, M.P. 222° C. By treatment with nitrous acid, this diamino compound is converted into cyclohexyl-bis-(m-hydroxyphenyl)phosphine oxide, M.P. 222–223° C.

*Example III*

Into a 50-cc. spherical flask are introduced:

| | |
|---|---|
| Maleic acid | g-- 9.3 |
| Methyl-bis-(m-hydroxycyclohexyl)phosphine oxide | g-- 3.9 |
| Propylene glycol | g-- 5.65 |
| Hydroquinone | mg-- 1.5 |

The flask is heated for 3 hours 50 minutes on a silicone oil bath maintained at 230° C., the water formed by esterification being eliminated by introducing benzene drop-by-drop. The product is allowed to cool and brought into solution in 10 g. of styrene and then a portion of the styrene is driven off to obtain a polyester solution containing 30% by weight of styrene. The viscosity of this solution is 150 poises at 25° C.

The polyester obtained has a hydroxyl equivalent of 0.038 and a carboxyl equivalent of 0.038 per 100 g. of resin.

There are added to the solution:

1% of "Butanox" (50% solution methyl ethyl ketone peroxide in methyl phthalate)
0.2% of cobalt octoate (containing 6% of metallic cobalt).

The mixture is immediately poured into a mould and is maintained at ambient temperature. The solution gels at the end of 30 minutes. After 5 hours, a yellow resin of great hardness is obtained.

I claim:
1. A compound of the formula:

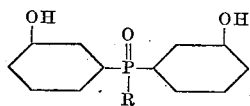

wherein R represents a radical selected from the class consisting of alkyl of 1 to 4 carbon atoms and cycloalkyl of 5 to 8 carbon atoms.

2. Methyl-bis-(m-hydroxycyclohexyl)phosphine oxide.
3. Cyclohexyl - bis - (m - hydroxycyclohexyl)phosphine oxide.

References Cited by the Examiner
UNITED STATES PATENTS

| | | | |
|---|---|---|---|
| 2,646,420 | 7/1953 | Morgan | 260—75 |
| 2,911,389 | 11/1959 | Pernert | 260—75 |
| 3,005,029 | 10/1961 | Buckler et al. | 260—606.5 |
| 3,116,334 | 12/1963 | Buckler et al. | 260—606.5 |

TOBIAS E. LEVOW, *Primary Examiner.*

LOUISE P. QUAST, *Examiner.*

F. R. OWENS, *Assistant Examiner.*